United States Patent [19]

Freen

[11] Patent Number: 5,791,145
[45] Date of Patent: Aug. 11, 1998

[54] NATURAL GAS ENGINE CONTROL SYSTEM

[75] Inventor: Paul Douglas Freen, Titusville, Fla.

[73] Assignee: Cooper Cameron Corporation, Houston, Tex.

[21] Appl. No.: 736,918

[22] Filed: Oct. 25, 1996

Related U.S. Application Data

[63] Continuation of Ser. No. 312,920, Sep. 30, 1994, Pat. No. 5,622,053.

[51] Int. Cl.$^6$ ............... F02B 37/12; F02B 43/00
[52] U.S. Cl. ............... 60/603; 123/299; 123/434; 123/528
[58] Field of Search ............... 60/600–603; 123/299, 123/527, 434, 528

[56] References Cited

U.S. PATENT DOCUMENTS

| | | | |
|---|---|---|---|
| 2,521,634 | 9/1950 | Janssen et al. | |
| 3,575,146 | 4/1971 | Creighton et al. | 123/32 |
| 3,871,214 | 3/1975 | Masaki et al. | 73/116 |
| 3,982,503 | 9/1976 | Keranen | 123/32 EA |
| 4,050,428 | 9/1977 | Masaki | 123/119 EC |
| 4,060,714 | 11/1977 | Lappington et al | 364/431 |
| 4,112,756 | 9/1978 | MacLennan et al. | |
| 4,121,455 | 10/1978 | Haslett et al. | |
| 4,140,473 | 2/1979 | Hoehing et al. | |
| 4,220,040 | 9/1980 | Noguchi et al. | |
| 4,245,314 | 1/1981 | Henrich et al. | 364/431 |
| 4,246,773 | 1/1981 | Haruta | |
| 4,252,097 | 2/1981 | Hartford et al. | 123/381 |
| 4,276,600 | 6/1981 | Hartford et al. | 364/431 |
| 4,280,183 | 7/1981 | Santi | |
| 4,357,828 | 11/1982 | Nakano | 73/117.3 |
| 4,369,651 | 1/1983 | Szentes | 72/119 A |
| 4,386,858 | 6/1983 | Kude et al. | |
| 4,416,239 | 11/1983 | Takase et al. | 123/478 |
| 4,430,978 | 2/1984 | Lewis et al. | 123/527 |
| 4,444,337 | 4/1984 | Kude et al. | |
| 4,445,389 | 5/1984 | Potzick et al. | |
| 4,454,852 | 6/1984 | Hasegawa | 123/568 |
| 4,458,529 | 7/1984 | Nagaishi et al. | |
| 4,463,565 | 8/1984 | Rydquist et al. | |
| 4,496,286 | 1/1985 | Gagnon | |
| 4,527,417 | 7/1985 | Pravda | |
| 4,576,039 | 3/1986 | Muto et al. | 73/118 |
| 4,583,176 | 4/1986 | Yamato et al. | 364/431.1 |
| 4,596,133 | 6/1986 | Smalling et al. | |
| 4,600,993 | 7/1986 | Pauwels et al. | 364/431.05 |
| 4,625,697 | 12/1986 | Hosaka | 123/478 |
| 4,630,482 | 12/1986 | Traina | |
| 4,663,977 | 5/1987 | Vander Heyden | |
| 4,709,334 | 11/1987 | Abe et al. | 364/431.05 |
| 4,736,589 | 4/1988 | Iwasa | 60/602 |

(List continued on next page.)

FOREIGN PATENT DOCUMENTS

| 6-137156 | 5/1994 | Japan | 60/602 |

OTHER PUBLICATIONS

A Procedure for Calculating Fule Gas Blend Knock Rating for Large Bore Gas Engines and Predicting Engine Operation; F.S. Schaub et al., The American Society of Mechanical Engineers (1985).

*Primary Examiner*—Michael Koczo
*Attorney, Agent, or Firm*—Burns, Doane, Swecker & Mathis LLP

[57] ABSTRACT

A control system for an internal combustion engine can include a fuel molecular weight sensor to determine an actual and a desired Excess Air Ratio for an air/fuel mixture supplied to the engine. To prevent engine overload, the control system limits the amount of fuel delivered to the engine based on the amount of air available to the engine. High pressure exhaust gas can drive an air compressor which pressurizes inlet air. A exhaust bypass valve controls the amount of power delivered to the compressor, and the pressure and amount of inlet air delivered to the engine. Independent control of the main fuel flow and pilot fuel flow allows the control system to maintain a desired air/fuel ratio in the main combustion chamber and in the precombustion chamber.

26 Claims, 9 Drawing Sheets

U.S. PATENT DOCUMENTS

| | | |
|---|---|---|
| 4,825,380 | 4/1989 | Hobbs . |
| 4,829,449 | 5/1989 | Polesnak . |
| 4,873,961 | 10/1989 | Tanaka ................................ 60/601 |
| 4,892,072 | 1/1990 | Miwa et al. ........................ 123/340 |
| 4,907,556 | 3/1990 | Ishii et al. ......................... 123/486 |
| 4,951,503 | 8/1990 | Fini . |
| 4,976,241 | 12/1990 | Ishida et al. . |
| 4,986,243 | 1/1991 | Weissler, II et al. ............... 123/488 |
| 4,993,386 | 2/1991 | Ozasa et al. ...................... 123/417 |
| 5,036,669 | 8/1991 | Earlesson et al. . |
| 5,048,495 | 9/1991 | Onari et al. ....................... 123/492 |
| 5,052,230 | 10/1991 | Lang et al. . |
| 5,062,788 | 11/1991 | Best . |
| 5,081,969 | 1/1992 | Long, III ........................... 123/274 |
| 5,093,793 | 3/1992 | Suzuki ........................ 364/431.03 |
| 5,095,877 | 3/1992 | Kikuchi et al. .................... 123/492 |
| 5,116,356 | 5/1992 | Ohkubo et al. .................... 123/425 |
| 5,129,228 | 7/1992 | Kondo ................................ 60/274 |
| 5,131,224 | 7/1992 | Siewert et al. . |
| 5,131,228 | 7/1992 | Mochizuki . |
| 5,136,880 | 8/1992 | Norgauer ........................... 73/117.3 |
| 5,137,000 | 8/1992 | Stepper et al. .................... 123/478 |
| 5,146,886 | 9/1992 | Männle et al. .................... 123/325 |
| 5,148,791 | 9/1992 | Nagano et al. .................... 123/417 |
| 5,152,174 | 10/1992 | LaBudde . |
| 5,159,912 | 11/1992 | Klein et al. ....................... 123/481 |
| 5,172,550 | 12/1992 | Takeshima . |
| 5,199,394 | 4/1993 | Hartmann et al. ................ 123/179.1 |
| 5,201,581 | 4/1993 | Vander Heyden et al. . |
| 5,201,907 | 4/1993 | Hitomi et al. . |
| 5,205,253 | 4/1993 | Shelef et al. ...................... 123/198 D |
| 5,205,260 | 4/1993 | Takahashi et al. ................ 123/494 |
| 5,206,809 | 4/1993 | Iwakiri et al. . |
| 5,216,916 | 6/1993 | Bederna et al. ................... 73/118.1 |
| 5,218,941 | 6/1993 | Suzuki et al. ..................... 123/478 |
| 5,219,227 | 6/1993 | Yang et al. . |
| 5,230,322 | 7/1993 | Curran et al. ..................... 123/694 |
| 5,235,954 | 8/1993 | Sverdlin ............................ 123/447 |
| 5,237,523 | 8/1993 | Bonne et al. . |
| 5,238,030 | 8/1993 | Miller et al. . |
| 5,249,453 | 10/1993 | Usami et al. . |
| 5,253,632 | 10/1993 | Brooks ............................. 123/696 |
| 5,259,239 | 11/1993 | Giasford . |
| 5,259,424 | 11/1993 | Miller et al. . |
| 5,268,842 | 12/1993 | Marston et al. ................. 364/431.05 |
| 5,275,142 | 1/1994 | Kapellen et al. ................. 123/436 |
| 5,275,553 | 1/1994 | Frish et al. . |
| 5,281,915 | 1/1994 | Takahama et al. . |
| 5,293,852 | 3/1994 | Lehner et al. .................... 123/339 |
| 5,296,196 | 3/1994 | Takeshima . |
| 5,311,447 | 5/1994 | Bonne . |
| 5,313,826 | 5/1994 | Klauber et al. ................... 73/118.1 |
| 5,325,703 | 7/1994 | Magori . |
| 5,343,760 | 9/1994 | Sultan et al. . |
| 5,365,902 | 11/1994 | Hsu .................................. 123/299 |
| 5,386,698 | 2/1995 | Kamei . |
| 5,392,635 | 2/1995 | Cadet et al. . |
| 5,408,979 | 4/1995 | Backlund et al. . |
| 5,421,212 | 6/1995 | Mayranen et al. . |
| 5,537,854 | 7/1996 | Phillips et al. . |

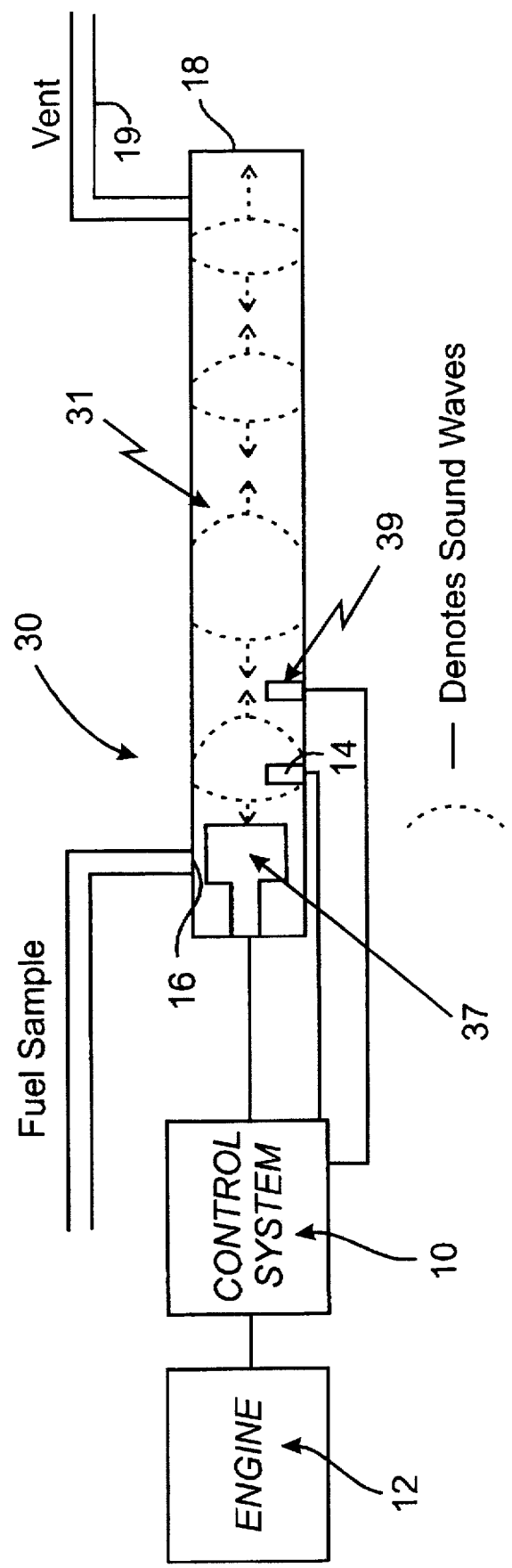

NATURAL GAS ENGINE CONTROL SYSTEM

This application is a continuation of U.S. application Ser. No. 08/312,920, filed on Sep. 30, 1994, U.S. Pat. No. 5,622,053.

BACKGROUND

1. Field of the Invention

The present invention relates generally to a control system for an internal combustion engine, and more particularly to a control system for a fuel injected, natural gas engine designed to protect the engine, allow the engine to be started, control the engine speed, and maintain desired exhaust emission levels.

2. Description of the Related Art

Various methods for electronically controlling the operation of internal combustion engines are known in the art. For example, many automotive engines utilize electronic control systems to control various engine operating parameters, such as fuel flow rate and air/fuel ratio. The control system will often utilize sensors to monitor engine operating conditions and will output electronic signals to control the operation of the engine according to a control process.

A typical control system may include an exhaust gas oxygen sensor, for example, to provide feedback to the control system for adapting the engine's air/fuel ratio to a desired value, such as the stoichiometric air/fuel ratio. At the stoichiometric air/fuel ratio, all the air in the combustion chambers completely oxidizes all of the injected fuel during combustion, leaving no oxygen in the exhaust gasses. The amount of oxygen in the exhaust, therefore, can provide an indication as to the relationship between the actual air/fuel ratio supplied to the engine and a desired air/fuel ratio such as the stoichiometric air/fuel ratio.

Electronic control systems have also included fuel control systems to meter the amount of fuel delivered to the engine over a range of operating conditions. Typically, a fuel control system, or "governor," will generate a fuel command signal indicative of the rate at which fuel is to be delivered to the engine to maintain the actual engine speed at a desired engine speed. The actual and desired engine speeds can be monitored by sensors, such as an engine speed sensor and a throttle sensor.

Prior engine control systems have encountered problems in controlling engine operating parameters, however, because they have often included an independent fuel and air/fuel ratio controller. In this type of control system, the fuel flow is set based on desired engine speed and the air/fuel ratio is set independently according to a predetermined value. Such control logic fails to protect the engine from receiving an unacceptably rich air/fuel mixture when there is insufficient air available at the intake, since the fuel level is set independently of the air/fuel ratio. This can occur, for example, when a step load is applied to the engine.

Furthermore, natural gas engines have encountered problems in operation when the natural gas supplied to the engine is not of uniform molecular weight. Because the molecular weight of natural gas is correlated to its energy content, the operation of a natural gas engine will vary considerably depending on the molecular weight of the natural gas being used. In engines which do not account for fuel molecular weight, when "hot" fuel, which has a high energy content and high molecular weight, is injected into the engine, the engine immediately receives a rich air/fuel mixture because the fuel gas has a high energy to volume ratio and the intake manifold pressure remains constant.

A rich air/fuel mixture can increase the possibility of detonation, or engine knock, especially with a high engine load, which can cause serious mechanical failures. Also, a rich air/fuel ratio can result in high emissions of nitrogen oxides. At a minimum, therefore, the engine's exhaust emissions will vary considerably, possibly causing the engine to be out of compliance with government emission regulations.

Independent governor and air/fuel ratio controllers also require additional logic for starting and do not protect the engine from overload. Prior engines, for example, have controlled fuel pressure during starting using a simple ramp function which can cause flooding unless additional control logic is provided to adapt the ramp according to ambient conditions such as air temperature and fuel temperature.

Prior engines have also suffered from defects relating to a single controller of pilot and main fuel flow rates. Engines with large combustion chambers, for example those which burn natural gas, often include a precombustion chamber in which a small quantity of gas is ignited and subsequently directed into a main combustion chamber. The ignited gas covers a much larger volume than a spark from a single spark plug, and can therefore ignite the fuel in the main combustion chamber much more rapidly. If the air/fuel ratio in the precombustion chamber is near the stoichiometric air/fuel ratio, ignition of the fuel occurs most rapidly. However, many engines utilize a single fuel flow controller to inject fuel into the main combustion chamber and the precombustion chamber. Thus, when the air/fuel ratio in the main combustion chamber is rich, the air/fuel ratio in the precombustion chamber will also be rich. Consequently, rapid burning is inhibited because the air/fuel ratio in the precombustion chamber is considerably in excess of the stoichiometric air/fuel ratio. Further, because excess pilot fuel is delivered to the precombustion chamber, fuel consumption has been greater than necessary.

U.S. Pat. No. 5,555,867 entitled "Swirl Flow Precombustion Chamber" discloses a combustion system including a precombustion chamber that may be used with the present invention and is hereby incorporated by reference.

SUMMARY

It is an object of the present invention to provide an engine control system and method capable of improving starting performance, fuel consumption, load carrying capability, speed governing performance, and exhaust emission control.

The control system and method according to exemplary embodiments of the present invention solves the problems of an independent fuel and air/fuel ratio controller by integrating the two systems into one. The control system limits the amount of fuel delivered to the engine based upon the air available to the engine, thus preventing the air/fuel ratio from becoming unacceptably rich. When there is sufficient air available, the governor control loop takes over and controls the engine speed. The system is therefore able to effectively protect the engine from overfueling, for example during starting.

According to an exemplary embodiment of the present invention, an exhaust bypass valve (or "wastegate") can also be provided to direct a desired amount of exhaust gas to bypass a turbine which drives an inlet air compressor. The compressor pressurizes inlet air to the extent necessary to achieve a desired air/fuel ratio or excess air ratio (EAR).

It is a further object of the invention to provide an engine control system and method which adjusts operation of the engine according to fuel quality, which is preferably measured with a fuel molecular weight sensor. The fuel molecular weight sensor measures the molecular weight of the fuel by measuring the speed of a wave propagated through a gaseous sample of the fuel. Because the molecular weight of the gas is correlated to its energy content or heating value, the control system can utilize the natural gas molecular weight sensor to compensate for changing natural gas fuel quality, thus preventing damaging detonation with high heating value fuels.

It is a further object of the invention to provide a control system and method which includes an alarm and trip system to alert the user to engine anomalies and to shut down the engine in appropriate circumstances.

It is a further object of the invention to provide a control system and method which independently controls a main fuel flow rate delivered to a main combustion chamber and a pilot fuel flow rate delivered to a precombustion chamber.

The invention thus improves the starting performance, fuel consumption, load carrying capability and speed governing performance of a natural gas engine. It also controls exhaust emissions over a wider range of operating conditions than has been possible in prior engines. The control system provides improved engine protection over other control systems by utilizing a natural gas molecular weight sensor along with additional instrumentation to measure and compensate for varying conditions.

BRIEF DESCRIPTION OF THE DRAWINGS

The foregoing and other objects, features and advantages of the present invention will be more readily understood upon reading the following detailed description in conjunction with the drawings in which:

FIG. 9 shows a diagram of an exemplary molecular weight sensor assembly including a passage for propagating a wave through a sample of a gaseous fuel.

DETAILED DESCRIPTION

Figure 1:
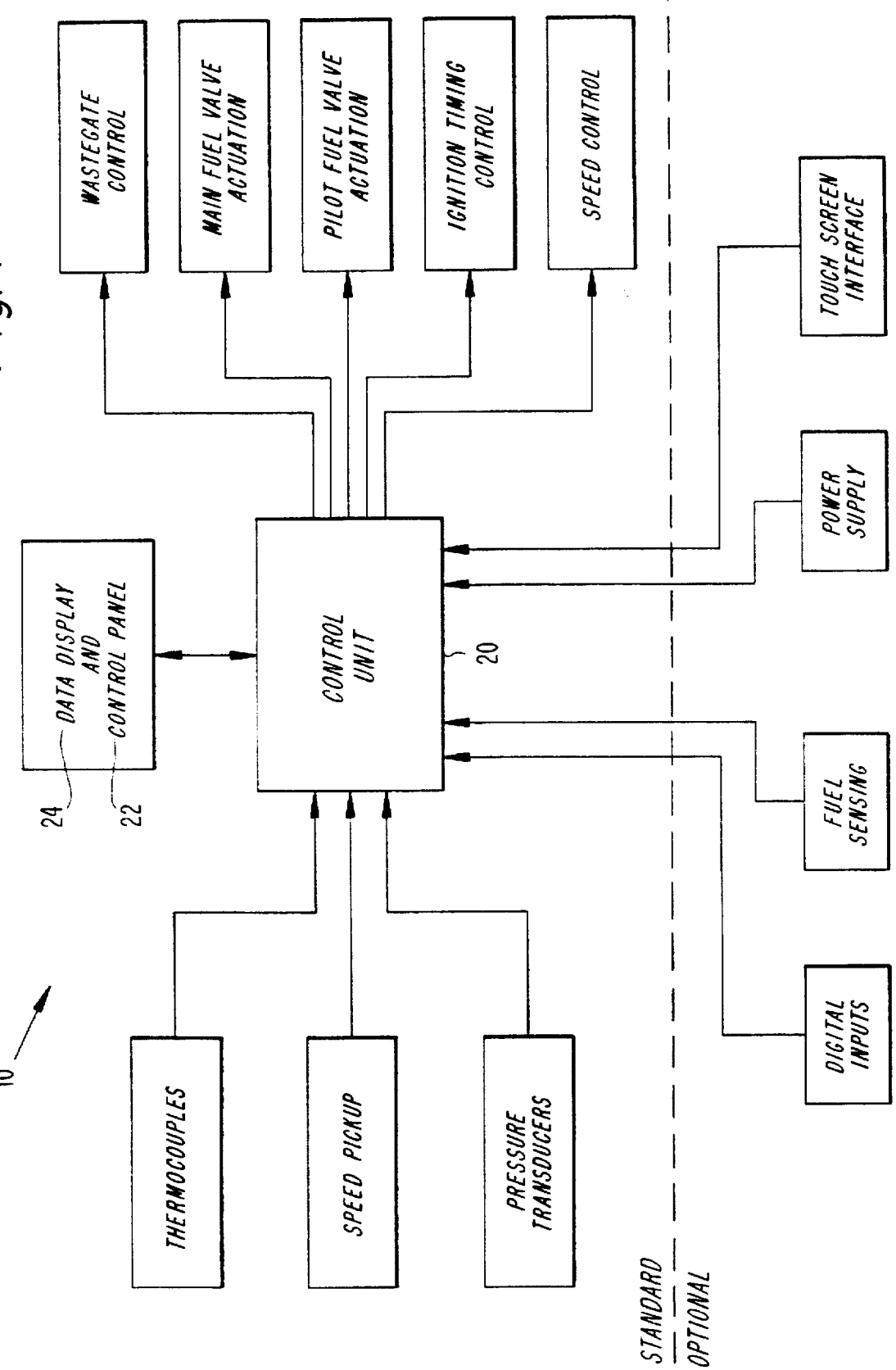
FIG. 1 shows a diagram of the components of an engine control system according to one embodiment of the present invention.
Figure 2:
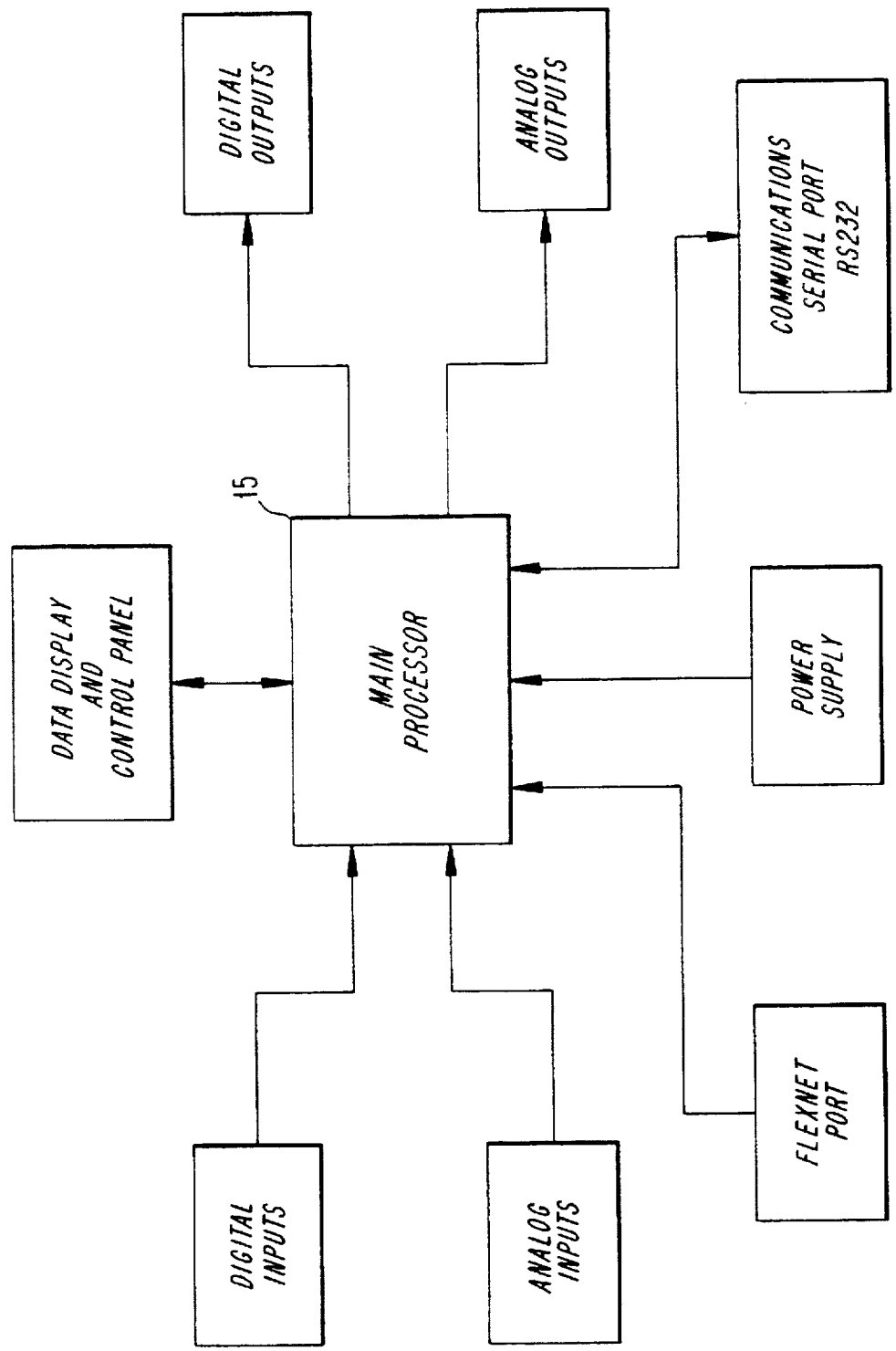
FIG. 2 shows a diagram of connections to a main processor of the control unit of FIG. 1.

FIGS. 1 and 2 show components of the control system 10 according to an exemplary embodiment of the invention. The control unit 20 shown in FIG. 1 may include a main computer or processor 15 that can be controlled by one or more programs. System software for the computer 15 can be designed to allow an engine to safely respond to a given load while maintaining desired emission levels and achieving low fuel consumption. The system software can also control safety shutdowns and alarms which are measured and monitored by the control system 10.

The control system 10 can be implemented as a modular, integrated system which safely allows the engine to meet an applied load while controlling emission levels. A modular system can utilize connectors on all control system elements, such as sensors and actuators, which can be connected to the control unit 20 with wiring harnesses, for example. The control unit 20 preferably includes 32 digital inputs, 16 analog inputs, 24 thermocouple inputs, 16 digital outputs, 6 analog outputs, 2 RS-232 Serial Communication Ports, a 24-volt power supply, and a Flexnet port.

A modular design of the system allows simple diagnostics and replacement of components and modules in the field with minimal down time. These components and modules can be stocked in warehouses so as to be readily available to a user. The components and modules can be pre-tested and calibrated to achieve a high degree of reliability.

Figure 3:
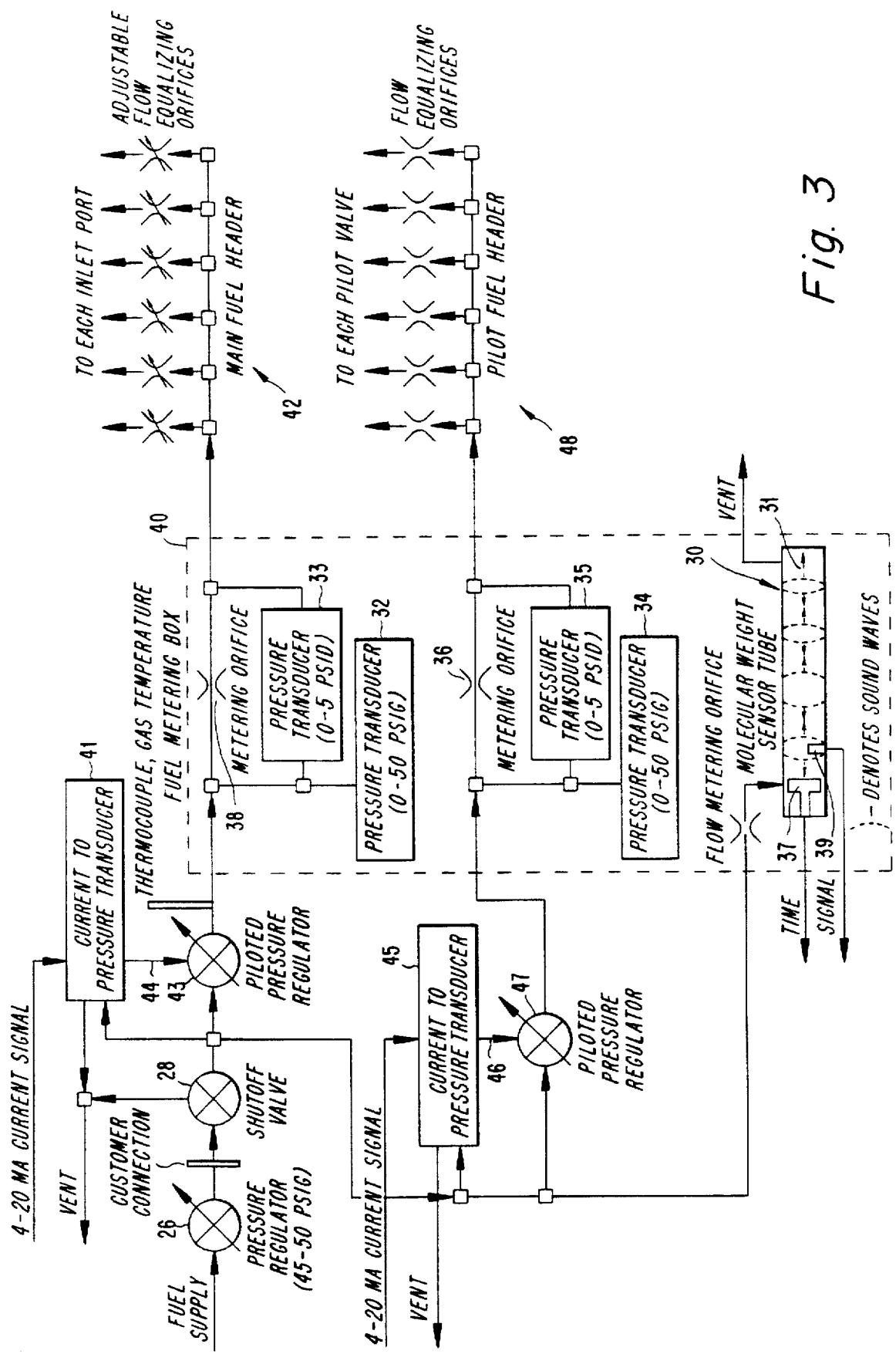
FIG. 3 shows a diagram of an exemplary fuel system which can be used in conjunction with the engine control system.

FIG. 3 shows a fuel system according to an exemplary embodiment of the present invention. As fuel, air and exhaust systems function similarly on many natural gas engines, the control system according to the present invention can be applied to a variety of engines with only minor modifications.

In FIG. 3, fuel can be supplied to the engine through a pressure regulator 26 which is preferably set at 45 to 50 PSIG. The fuel flows through a bubble-tight shutoff valve 28 which can be controlled by the control system 10. The fuel flow is preferably split into three sections. The first section meters the main fuel flow to the main combustion chambers of the engine. The second section meters the pilot fuel flow to the precombustion chambers of the engine. The third section supplies a small amount of fuel to a fuel molecular weight sensor 30 according to an exemplary embodiment.

Main fuel flow can be measured using an orifice run 38. As shown in FIG. 3, the main gas flows through the precision orifice 38 located between a main fuel valve 44 and a main fuel header 42. The main fuel valve 44 is preferably an electric-pneumatic pressure regulator which includes a piloted pressure regulator 43 and a current to pressure transducer 41. As the fuel flows through the orifice 38, a pressure drop across the orifice 38 is created. The upstream orifice gas pressure and the pressure difference across the orifice 38 can be measured by pressure transducers 32 and 33, respectively. The gas temperature and the gas specific gravity can also be measured, and the gas specific heat ratio can be calculated. The mass flow rate of gas can then be computed using an orifice flow equation. The metering orifice 38 can preferably be sized to produce a 4 psi differential pressure across the orifice at 110% load and 1200 RPM with pipeline quality fuel.

Pilot fuel flow can also be measured using an orifice run 36. As shown in the fuel system diagram of FIG. 3, the pilot gas flows through a precision orifice 36 located between the pilot fuel valve 46 and the pilot fuel header 48. The pilot fuel valve 46 is preferably an electric-pneumatic pressure regulator which includes a piloted pressure regulator 47 and a current to pressure transducer 45. As the fuel flows through the orifice 36, a pressure drop across the orifice 36 is created. The upstream orifice gas pressure and the pressure difference across the orifice 36 can be measured by pressure transducers 34 and 35, respectively. The gas temperature and the gas specific gravity can also be measured, and the gas specific heat ratio can be calculated. The mass flow rate of gas can then be computed using an orifice flow equation. The metering orifice 36 can preferably be sized to produce a 4 psi differential pressure across the orifice at 110% load and 1200 RPM with pipeline quality fuel.

The pressure transducers 32–35, pilot and main fuel metering orifices 36 and 38, and a molecular weight sensor 30 can all be housed in a fuel metering box assembly 40.

Figure 4:
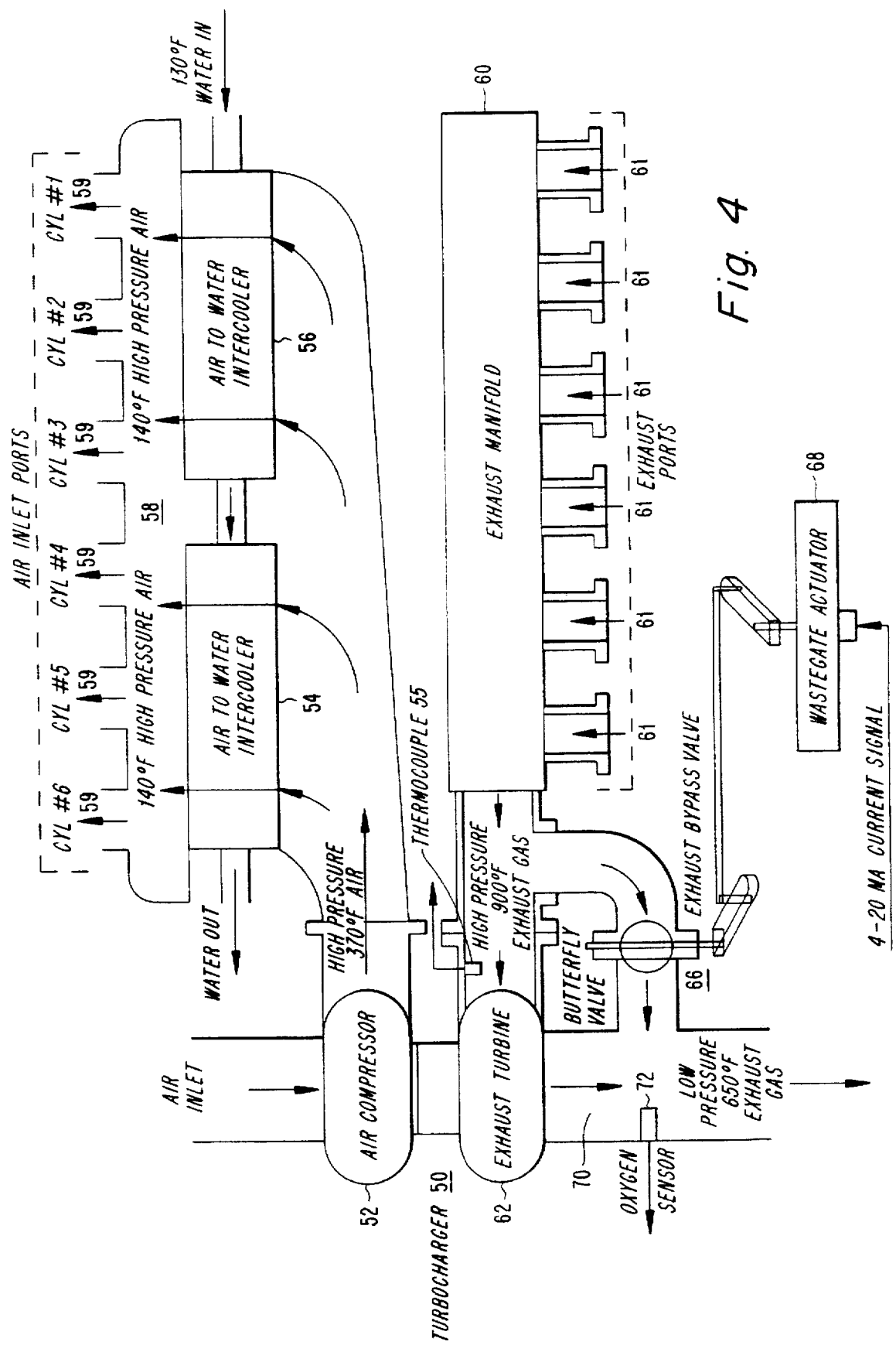
FIG. 4 shows a schematic of an air and exhaust system.

FIG. 4 shows a schematic of an exemplary air and exhaust system according to the present invention. Ambient air preferably enters a turbocharger 50 where a radial flow compressor wheel of a compressor 52 compresses the air. During compression, the air temperature increases. At full load, the temperature of the air may reach approximately 370 degrees Fahrenheit, for example. The air then flows through two air-to-water heat exchangers (intercoolers) 54 and 56 where the high-pressure air can be cooled by the intercooler water to preferably 140 degrees Fahrenheit. The air exits the two intercoolers into a common plenum 58. The air inlet port 59 for each cylinder head may be connected to the plenum 58 through a rubber bushing. Each cylinder head has two inlet valves, through which valves the air then flows into the cylinders.

The exhaust system preferably functions as follows. The exhaust gas flows out of each cylinder head through exhaust ports 61 and collects in a water-cooled, constant-pressure exhaust manifold 60. The hot, high-pressure exhaust gas flows into a radial flow exhaust turbine 62 of the turbocharger 50. This high pressure hot exhaust drives the turbine 62, which then drives the air compressor 52 to compress the inlet air. The amount of air delivered to the engine can be controlled by bypassing some of the hot, high-pressure exhaust gas around the turbine 62. This bypass slows the rotation of the turbine, thus reducing the air manifold pressure, which reduces the air flowing to the engine. The exhaust bypass valve (wastegate) 66 can be a butterfly valve controlled by an electric-pneumatic actuator 68. The wastegate actuator 68 can control the air/fuel ratio of the engine. The bypassed exhaust gas and the low-pressure gas leaving the turbine 62 collect in an exhaust pipe 70, where sensor 72 can measure oxygen content before the exhaust flows out of a stack.

Engine combustion air flow can be measured using what is commonly known as a speed-density routine. According to this exemplary method, the engine can be visualized as a positive displacement air pump. A fixed volume of air flows through the engine for every two revolutions of the crankshaft. The efficiency of the air pump can be defined by the engine's volumetric efficiency which is defined as the ratio of the volume of the gaseous mixture inducted into the engine to the piston displacement. The volume flow rate of air through the engine therefore equals:

$$FR = RPM * VE * D/2,$$

wherein:

FR=volume flow rate of air through the engine (ft$^3$/sec)

RPM=revolutions per minute of the engine (sec$^{-1}$)

VE=volumetric efficiency

D=piston displaced volume (ft$^3$)

To convert the volume flow rate of air to a mass flow rate, the volume flow rate is multiplied by the air density, which can be calculated using the air manifold temperature and pressure.

Figure 5:
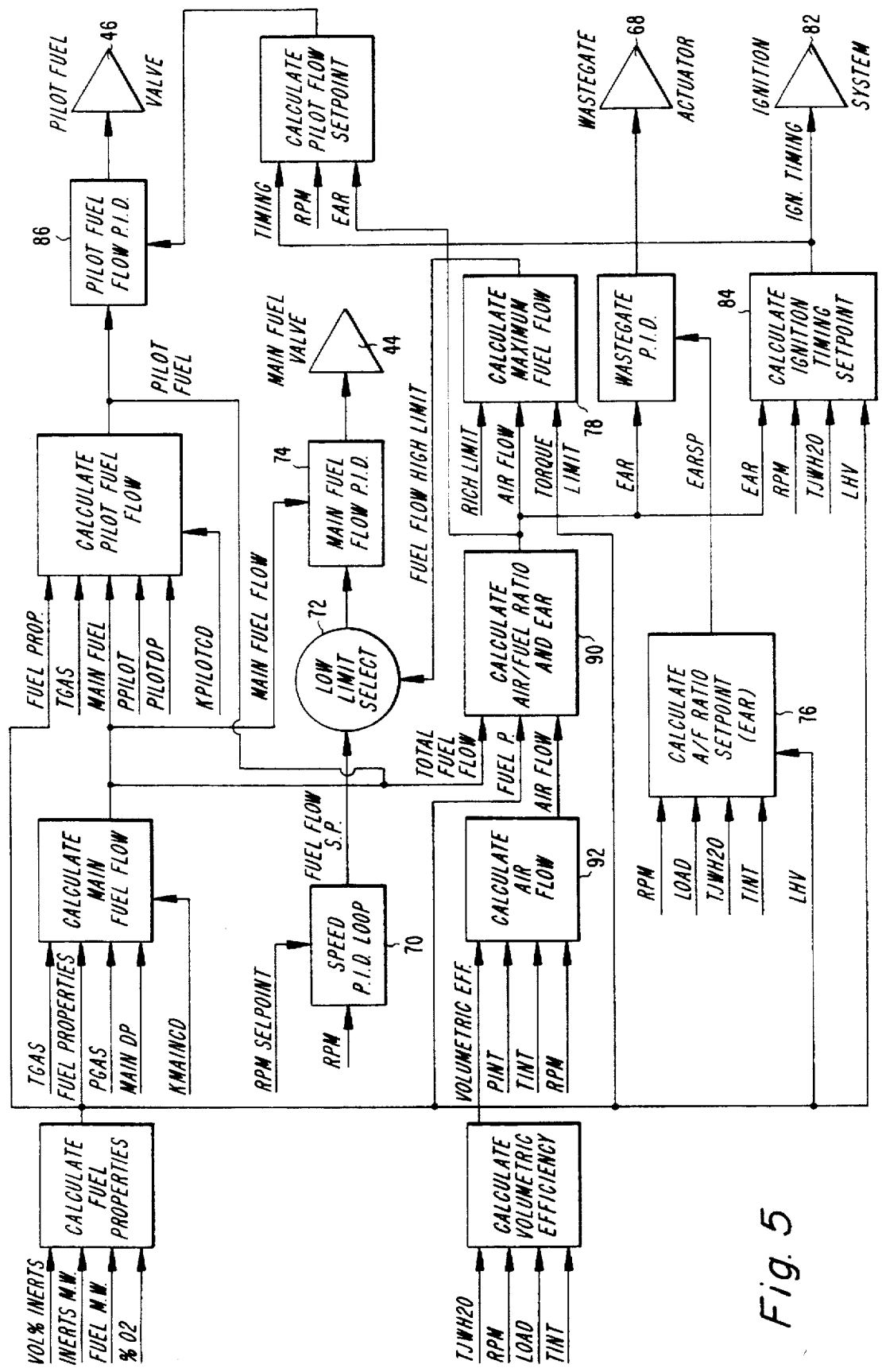
FIG. 5 shows a schematic control diagram for the engine control system.

FIG. 5 is a schematic diagram of the control system 10 according to an exemplary embodiment of the invention. The control system 10 can utilize control routines, illustrated in FIG. 5 as boxes, which serve as the fundamental workings of the control system and which are implemented by the processor 15 of the control unit 20. The Figures show these workings but do not cover the details known to those of ordinary skill in the art. The control system 10 can utilize the main processor 15 which can be a computer and system software to control the engine, start and stop sequencing, fuel quality compensation, trips, and alarms. The control of the engine can be broken down into speed governing, air/fuel ratio control, ignition timing control, main fuel flow control, and pilot fuel flow control.

The control system 10 preferably governs speed through an electronic, integrated system without the need for a separate mechanical governor. Engine speed (RPM) can be sensed via an engine speed sensor such as a magnetic pickup which monitors a 180-tooth wheel attached to the engine damper. A signal indicative of engine speed can be provided through a frequency-to-voltage conditioner (5 kilohertz=5 volts, for example), transmitted as a voltage to the control unit 20 where it can be digitized by an analog-to-digital converter, read into the control computer program as a digital number, and converted to engineering units. The RPM signal can be fed into a control loop 70 which compares this signal to an RPM speed setpoint. The control loop 70 can then determine an appropriate mass flow rate of fuel, depending on whether the engine is above or below the speed setpoint and output a fuel flow setpoint signal. The fuel flow setpoint signal is then compared to an instantaneous maximum fuel flow limit by comparator 72, and the lower of the two is sent to the fuel flow control loop 74.

As described above, actual air flow delivered to the engine can be calculated by routine 92 using a speed-density routine, and the main and pilot fuel flows can be measured using orifice runs 38 and 36. The actual air/fuel ratio can then be calculated by routine 90 by dividing the measured air flow by the measured fuel flow (main fuel flow plus pilot fuel flow). Air/fuel ratio is defined as the ratio of the mass of air to the mass of fuel for a given air/fuel mixture. The air/fuel ratio can be converted to an Excess Air Ratio (EAR) by dividing the air/fuel ratio by the stoichiometric air/fuel ratio. The stoichiometric air/fuel ratio is defined as the mass ratio of air to fuel where, when combustion occurs, all of the fuel and all of the air are converted to combustion products. The stoichiometric air/fuel ratio is a function of the fuel constituents, therefore it changes with fuel molecular weight. An EAR of less than 1 indicates that there is raw, unburned fuel in the exhaust, and an EAR of greater than 1 means that there is air in the exhaust. Lean burn engines operate with an EAR of greater than 1, indicating that there is excess air (or oxygen) in the exhaust.

The control system 10 preferably controls EAR, not air/fuel ratio, primarily via the turbocharger exhaust bypass valve (wastegate) 66. Exhaust gas can bypass the turbocharger turbine 62, thus reducing the air manifold pressure. The measured EAR can be compared with an EAR setpoint, and the wastegate position is varied by the wastegate actuator 68 until the EAR setpoint substantially equals the actual EAR.

The EAR setpoint can be set by routine 76 by utilizing RPM, engine load, jacket water temperature (water temperature in the radiator), air manifold temperature and fuel quality. The EAR setpoint can be determined by the best tradeoff between exhaust emissions and fuel consumption.

The EAR can also be controlled by the main fuel valve 44. In a situation in which a step load is applied, the main fuel valve 44 can supply fuel much faster than the turbocharger 50 can speed up and supply more air. In such a case, the main fuel valve 44 can be prevented from opening too much and overfueling the engine. Thus, the actual EAR of the engine can be limited so that the engine operates within safe EAR limits.

According to an exemplary embodiment of the invention, two variables can be utilized to limit the EAR at routine 78. First, an air/fuel ratio limit or a "rich limit", as shown in FIG. 5, can be set by the user via the control panel 22 of FIG. 8, according to a desired limiting value of air/fuel ratio or EAR. Second, a "torque limit", also conventionally known as a "knock limit", can be set, as shown in FIG. 5. The torque limit or knock limit serves as a limit on the amount of work that will be performed by the engine. The torque limit or knock limit for a particular engine can be conventionally determined by correlating, using the efficiency of the engine, the heating value of the fuel being used to the resulting amount of work or torque output by the engine, so that knocking does not occur, for example. An instantaneous torque can be computed as a product of fuel flow rate, fuel heating value, RPM and engine efficiency according to thermodynamic principles known to those of ordinary skill in the art. The torque limit thus limits the amount of work output by the engine based on the energy content of the fuel. Because it is based on the energy content of the fuel, it can be set using the molecular weight determined by the molecular weight sensor 30.

The rich limit and the torque limit can be used to limit the amount of fuel delivered to the engine by the main fuel valve 44. These two values can be compared at routine 78 to determine a maximum fuel flow limit which is sent to the low limit select routine 72. Alternatively, these two values as well as the fuel flow set point determined by engine RPM can be compared simultaneously in a single routine, with the lowest value of allowable fuel flow controlling the fuel flow delivered to the engine by the main fuel valve 44.

The ignition timing is controlled by the ignition system 82. (See FIG. 5.) The ignition timing setpoint is preferably communicated by the control unit 20 to the ignition system 82 via a 4–20 milliamp (ma) loop. The ignition timing setpoint can be determined by routine 84 according to EAR, engine RPM, jacket water temperature, air manifold temperature and fuel quality. The desired ignition timing can be determined by the best tradeoff between emissions, fuel consumption, step load response and engine safety.

The main fuel flow rate can be controlled by the main fuel valve 44, which is preferably an electric-pneumatic pressure regulator. The actual fuel flow can be measured as described above using an orifice run 38. The measured fuel flow can be compared to a fuel flow setpoint by routine 74, and the fuel control valve output pressure can be varied until the actual fuel flow equals the fuel flow setpoint. The fuel flow setpoint is preferably determined by the lower of the fuel flow called for by the governor control loop 70 and the instantaneous maximum fuel flow limit computed at 78 to prevent an over-fuel condition in the engine. Thus, the control system 10 controls engine speed, obtaining a setpoint from the governor control loop 70, and limits the EAR to a safe operating range.

The pilot fuel flow rate can be controlled independently, also via a pilot fuel valve 46, which is preferably an electric-pneumatic pressure regulator. The actual pilot fuel rate can be measured as described above using an orifice run 36. The measured pilot fuel flow can be compared to the pilot fuel flow setpoint at 86, and the pilot fuel valve output pressure can be varied until the actual pilot fuel flow rate equals a pilot fuel flow rate setpoint.

According to an exemplary embodiment, this setpoint can be a "pilot percent" setpoint, defined as the ratio of pilot fuel flow rate to total fuel flow rate:

$$PP = 100 * PF/(PF+MF)$$

wherein:

PP=pilot percent
PF=pilot fuel flow rate
MF=main fuel flow rate

The pilot percent setpoint can be set according to ignition timing, engine RPM, and EAR, to achieve the best tradeoff between emissions and fuel consumption. The pilot percent setpoint can then be converted to pilot flow rate setpoint and used by the pilot flow rate control loop 86.

According to a further embodiment, the pilot fuel flow rate setpoint can be set independently of the main fuel flow rate. Independent control of the pilot fuel flow allows the air/fuel ratio in the precombustion chamber to be maintained near a desired air/fuel ratio, such as the stoichiometric air/fuel ratio, despite a changing air/fuel ratio in the main combustion chamber. In prior engines where the two ratios were the same, when the air/fuel ratio in the main combustion chamber was rich, the same rich mixture was injected into the precombustion chamber during the compression stroke of the engine cycle. Thus, at a time when it may have been preferable that the air/fuel ratio injected into the precombustion chamber be leaner to compensate for a rich mixture entering from the main combustion chamber, the pilot fuel controller also delivered an excessive amount of fuel. The present control system overcomes this problem by independently controlling the pilot fuel flow to deliver a desired amount of fuel to the precombustion chamber, for example an amount sufficient to maintain a stoichiometric air/fuel ratio. A stoichiometric air/fuel ratio in the precombustion chamber allows for rapid ignition of the fuel in the precombustion chamber and the main combustion chamber.

Figure 6:
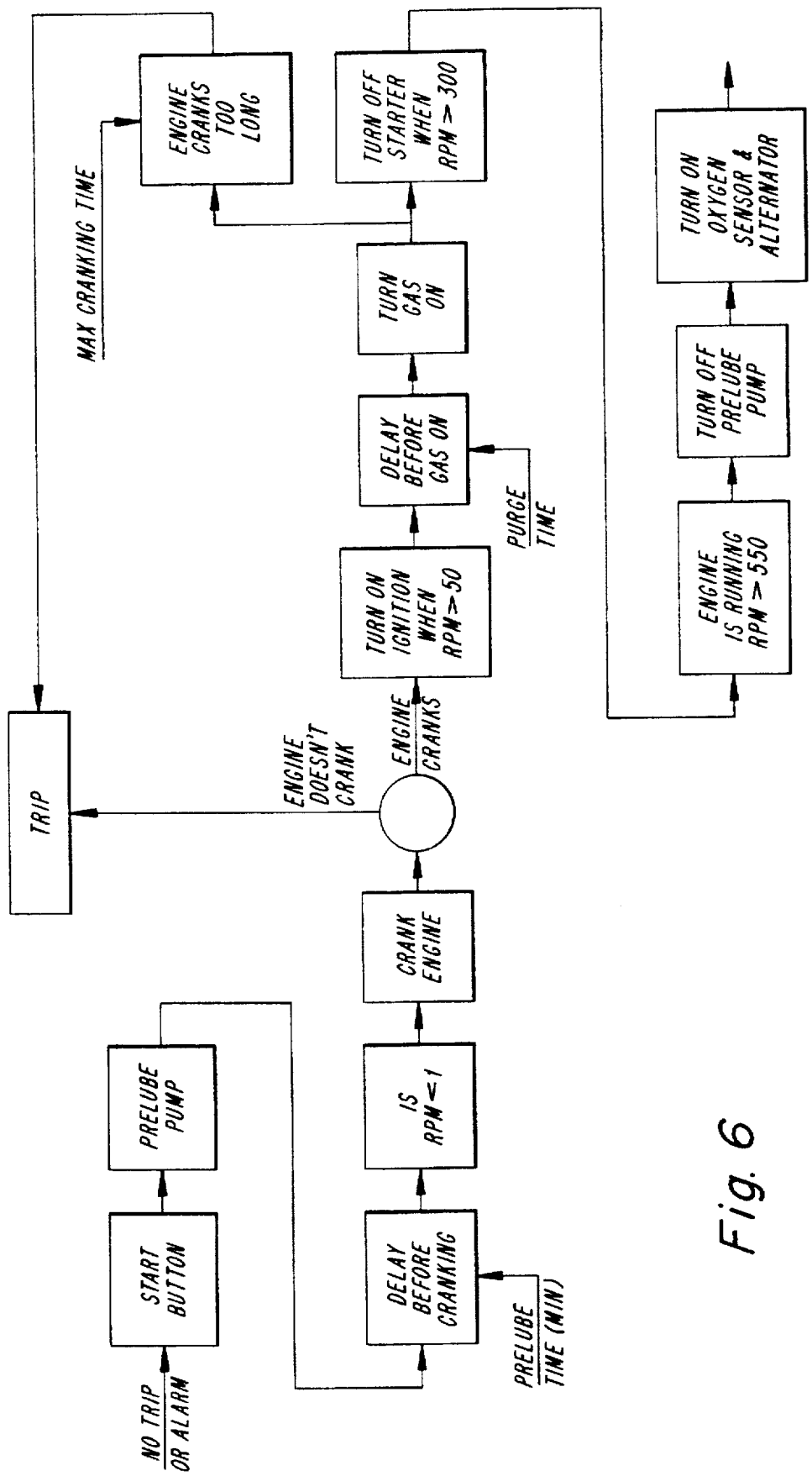
FIG. 6 shows a flow chart for a start sequence of the engine control system.

A flow chart describing an automatic start sequence according to an exemplary embodiment of the invention is shown in FIG. 6. During the automatic start sequence, the control system 10 can control a prelube pump, starter motor, ignition system and fuel gas supply to safely start the engine. Any trip condition which may occur during the start sequence can immediately cause the start to be aborted.

The engine can also be started manually, according to a further embodiment, by turning on the prelube pump, starter, ignition, and gas with the control switches 96 on the control panel 22.

Figure 7:
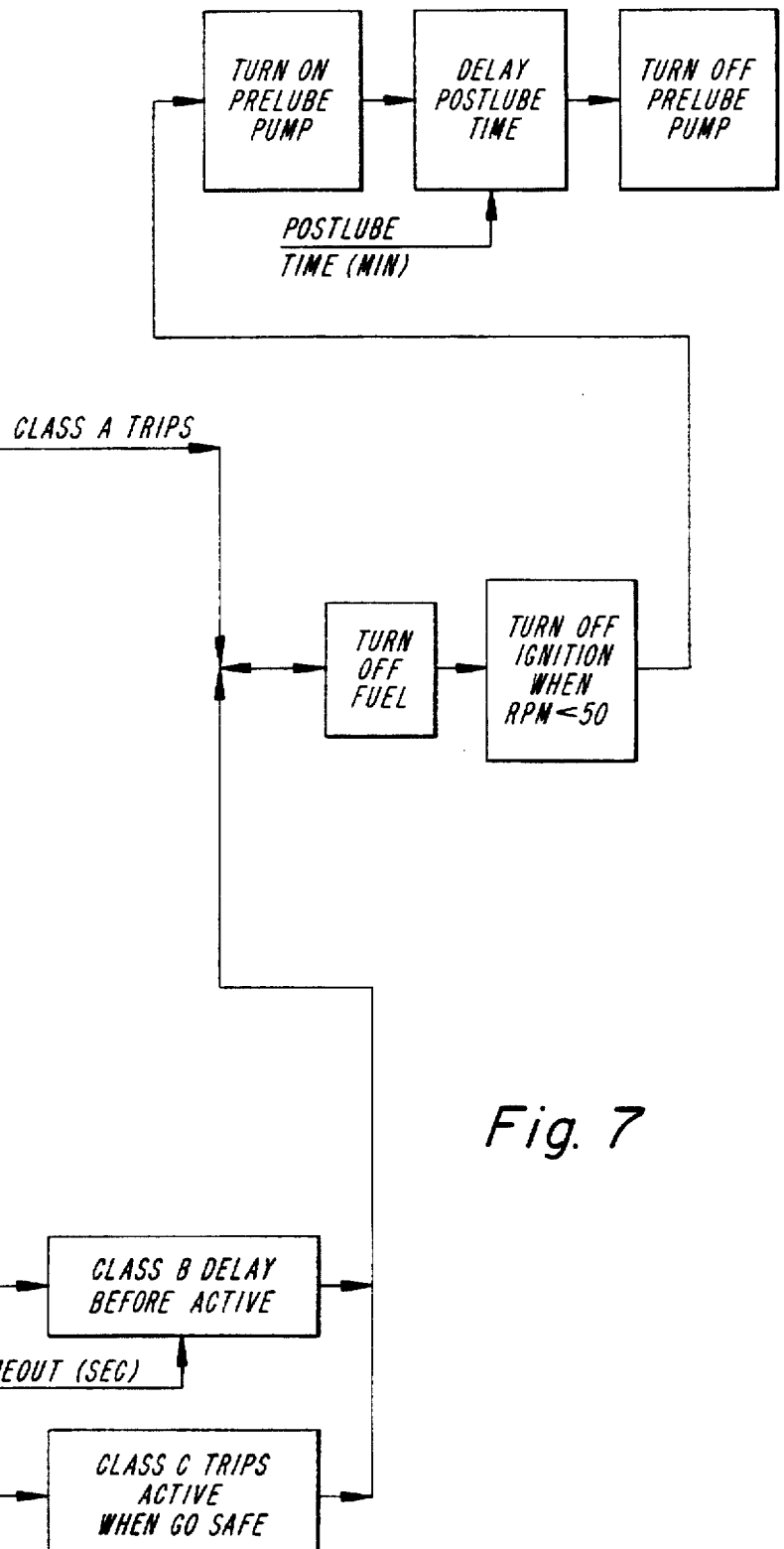
FIG. 7 shows a flow chart of engine trips and a shutdown sequence.

FIG. 7 shows a flow chart of the engine trips and a resulting shutdown sequence according to an exemplary embodiment of the invention. The control system 10 can accommodate class A, B, and C trip shutdowns. Class A shutdowns preferably are active once armed. Class B shutdowns become active after a predetermined time period after being armed. Class C shutdowns become active once armed and after toggling from a safe to an unsafe state. Trips can be indicated on the control panel 22 by a red lamp and can be registered on the data display 24 in the sequence in which they occur. The control system 10 can be configured so as to require the user to acknowledge each trip, for example by pressing an acknowledge button.

Alarm points and limits can be handled by the control system 10 in a similar manner. Alarms can be indicated on the control panel 22 by a flashing red lamp and can be registered on the data display 24 in the sequence in which they occur. The control system 10 can be configured so as to require the user to acknowledge each alarm by pressing an acknowledge button.

The control system 10 can allow a user to program certain constants for controlling the engine. For example, the following user programmable constants can be set:

RPM Setpoint Manual
Engine speed setpoint (650–1200 RPM)
RPM Setpoint Flag

0=Use 0 to 15 psig RPM setpoint

1=Use manual speed setpoint

External RPM Flag

0=Not used

1=RPM setpoint from external 4–20 ma signal

Turn-Off Time

Time in minutes at which the control system will shut itself off to conserve battery power if engine is not running.

Prelube Time

Time in minutes to prelube before cranking.

Postlube Time

Time in minutes to postlube after engine shutdown.

Maximum Crank Time

Maximum cranking time in seconds.

Reset Timer

Reset to 0 the resettable engine hours timer.

Class B Timeout

Time in minutes after engine start before Class B alarms and trips are active.

Start Cycle Purge Time

Cranking time in seconds (3–60) before turning on fuel valve.

Fuel Mole Weight High Limit

Fuel molecular weight will not exceed this limit.

Fuel Mole Weight Low Limit

Fuel molecular weight will not go below this limit.

Inerts

Volume percent of inerts in fuel (0–100).

Inerts Mole Weight

Molecular weight of inerts in fuel.

Program Optional Digital Inputs

1=Class A trip

2=Class B trip

3=Class C trip

4=Class A alarm

5=Class B alarm

6=Class C alarm

According to an exemplary embodiment of the invention, the control system 10 can be equipped with a fuel molecular weight sensor 30 and an exhaust oxygen sensor 72, as shown in FIGS. 3 and 4. The two sensors allow the control system 10 to compensate the engine control parameters so that the engine can safely run and maintain desired emission levels while utilizing a fuel having a varying molecular weight and energy content. These sensors are particularly useful, for example, when the engine runs on fuel having a heating value which varies randomly more than 50 BTU/standard cubic foot. In a further embodiment, a desired molecular weight of inerts and a volume percent of inerts in the fuel can be input by the user, via the control panel 22, for example if an exhaust oxygen sensor is not included in the control system 10. Also, a desired fuel molecular weight can be input by the user if a fuel molecular weight sensor is not included in the control system 10. This can be accomplished, for example, by setting the user programmable constants for both the low and high fuel molecular weight limits at the desired value.

As shown by the schematic diagram of the control system in FIG. 5, the fuel quality can be utilized in many of the control system calculations. The molecular weight of the fuel is a preferred example of a parameter representing fuel quality which can be utilized by the control system 10 to improve engine performance. In engines which do not account for fuel molecular weight, when "hot" fuel, which has a high energy content and high molecular weight, is injected into the engine, the engine immediately receives a rich air/fuel mixture because the fuel gas has a high energy to volume ratio and the intake manifold pressure remains constant. This can cause several problems. For example, hot fuels and rich air/fuel ratios promote engine knock, or detonation, which can cause serious mechanical failures. Also, a rich air/fuel ratio can result in high emissions of nitrogen oxides. At a minimum, therefore, the engine's exhaust emissions will vary considerably causing the engine to be out of compliance with government emission regulations.

According to an exemplary embodiment of the invention, the control system 10 measures the fuel's molecular weight directly to solve these problems. The system can utilize a molecular weight sensor 30 which propagates a wave such as a sound wave or ultrasonic wave through a gaseous sample of the fuel. The time period during which the wave travels the length of the passage and back can be measured to calculate the speed of the wave through the gas. This wave speed and the fuel temperature can be used to calculate the molecular weight of the fuel gas because the wave speed through a gas is a function of the gas's molecular weight and temperature.

FIG. 9 shows a diagram of a molecular weight sensor assembly 30 including a passage 31 in which a wave such as a sound wave or an ultrasonic wave can be propagated through the gaseous fuel. A sample of the fuel from the engine's main fuel line can be directed to the molecular weight sensor 30 and introduced into the passage 31 of the molecular weight sensor 30 through an orifice 16. The fuel can flow through the passage 31 and exits through a vent 19.

After the fuel has been introduced into the passage 31, a transducer 37 is activated to propagate a wave, such as a sound wave or an ultrasonic wave, through the fuel in the passage 31. The transducer 37 preferably includes a transmitter and a receiver, such as speaker and a microphone, which transmit the wave and receive a reflection of the wave.

The wave propagates from the transmitter of the transducer 37 at a first time point to the opposite end 18 of the passage 31 where it is reflected back to the receiver of the transducer 37 which receives the reflected wave at a second time point.

In an alternative embodiment of the present invention, the wave may be received by the receiver at any desired location in the passage 31 after travelling a specified distance through the fuel in the passage 31. For example, the receiver may be located at the opposite end 18 of the passage 31.

The transducer 37 may include an electronic circuit for outputting a signal indicative of the travel time of the wave between transmission by the transmitter and receipt by the receiver. For example, the transducer 37 can output a square wave having a width corresponding to the time during which the wave travels the specified distance in the passage 31. According to a further embodiment of the invention, the electrical output signal can be a 4–20 ma output signal indicative of the travel time of the wave.

According to an exemplary embodiment of the invention, the passage is preferably an 18-inch tube and the transducer is an ultrasonic transducer operating at a frequency of 150 kHz. Under these conditions, using natural gas having a variable molecular weight, the ultrasonic wave would travel the length of the 18-inch passage in approximately 0.95–1.4 milliseconds, depending on the molecular weight of the natural gas. The corresponding speed of the wave would be between 1572 feet/sec and 1051 feet/sec. The molecular weight sensor can be designed to operate between the temperatures of −90 and 150 degrees Fahrenheit and at a maximum pressure of 50 psig. The sensor may be powered with a 24-volt DC source.

The signal output from the transducer 37 may be sent to the control system 10 of an internal combustion engine 12. The control system 10 preferably includes a microprocessor or other means for computing speeds of the wave based on the travel time of the wave and the distance of travel. The distance of travel is preferably preprogrammed in the control system 10. The speed S of the wave in the passage 31 can then be computed by the control system 10 according to the following equation:

$$S = l/t$$

where:

l Length wave travels in sample passage t Time it takes for wave to travel length l In addition to measuring the speed of the wave, the temperature of the fuel may be measured by means such as a thermocouple 39, shown in FIG. 9. The thermocouple 39 may be located within the passage 31 or at another location such as the main fuel line. The fuel temperature is preferably communicated to the control system 10 by an electronic signal. The pressure of the gas in the molecular weight sensor also affects the propagation speed of the wave, as will be recognized by those of ordinary skill in the art. However, the pressure is preferably held at atmospheric pressure so as to eliminate it as a control variable. The molecular weight of the fuel sample can then be computed directly because it depends on the propagation speed of the wave through the fuel and the temperature of the fuel according to the following equation:

$$\text{molecular weight} = k*R*T_{gas}/S^2$$

where:

k=constant, specific heat ratio

R=constant, universal gas constant

Tgas=fuel gas temperature (°Rankine)

S=speed of sound through fuel sample (ft/sec)

Although the specific heat ratio of the fuel varies with the molecular weight of the fuel, the degree of change is generally insignificant. Thus, the molecular weight of the fuel sample can be directly computed utilizing the present invention.

According to a further embodiment of the invention, the molecular weight sensor can be operated at a pressure other than atmospheric pressure. In this case, the speed of the wave is affected by the gas pressure in the molecular weight sensor passage 31, and the equation for molecular weight can be modified according to well-known principles of physics to take account of the effect of different gas pressures on the speed of the wave. The gas pressure can be measured by a pressure transducer 14, as shown in FIG. 9, and sent to the control system 10 by an electronic signal.

The fuel's molecular weight can be used by the engine control system 10 to adjust ignition timing to prevent engine knock or detonation, vary air manifold pressure to deliver a desired air/fuel ratio to the engine, and limit a maximum load that the engine can respond to in order to prevent engine knock or detonation. Furthermore, the control system 10 can anticipate hot or cold burning by adjusting both pilot and main fuel flow based on the fuel molecular weight, maintain desired exhaust emission levels and prevent knocking.

Measuring the fuel's molecular weight also allows the control system 10 to measure the actual mass flow rate of fuel delivered to the engine. The mass flow rate and the measured air flow rate are used to determine the air/fuel ratio, which can be used to control the operation of an engine.

U.S. patent application Ser. No. 08/312,915 entitled "Natural Gas Molecular Weight Sensor" and filed concurrently with parent application Ser. No. 08/312,920, discloses a molecular weight sensor that may be used with the present invention. The subject matter of application Ser. No. 08/312,915 was incorporated by reference in parent application Ser. No. 08/312,920, and is incorporated herein by reference.

As discussed above, the control system 10 preferably controls EAR, not air/fuel ratio. This requires knowledge of the stoichiometric air/fuel ratio. The stoichiometric air/fuel ratio is determined not only by the fuel's molecular weight but also by the mass percent of inert gases in the fuel, such as carbon dioxide and nitrogen. The inerts can be accounted for in at least two ways. One method utilizes an oxygen sensor 72 (FIG. 4) to measure the amount of oxygen in the exhaust. The exhaust gas oxygen content combined with the fuel's molecular weight allows the mass percent of the inerts to be computed.

A second method utilizes the exhaust turbine inlet temperature measure via a thermocouple 55, as shown in FIG. 4, which preferably outputs a signal indicative of temperature to the control system 10. The control system 10 can monitor this temperature which can then be correlated to the mass percent of inert gasses in the fuel. As the mass percent of inerts in the fuel increases, the temperature at the exhaust turbine inlet decreases because there is less energy content in the fuel. This method can serve as a check on the oxygen sensor measurement.

Because most fuel gas is found to have a relatively constant mass percent of inerts, the fuel's inert content can also be manually entered into the control panel 22, according to an exemplary embodiment. The molecular weight sensor 30 can then provide a molecular weight correction to account for "hot" fuel.

Figure 8:
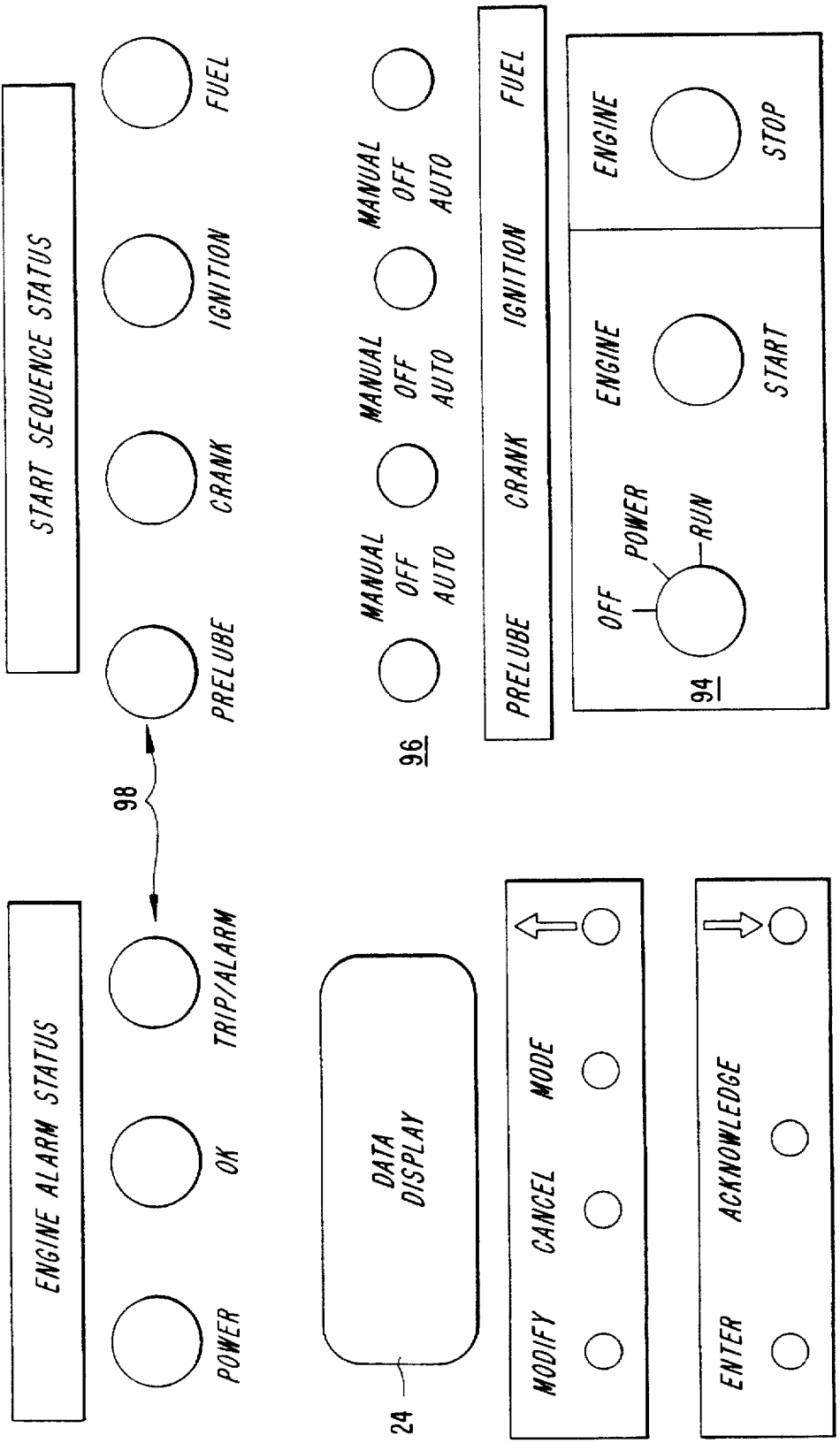
FIG. 8 shows an exemplary data display/control panel including a data display.

FIG. 8 shows an exemplary control panel 22 and data display 24, which can be provided according to a further embodiment of the invention. The control panel 22 can serve as a user interface to the engine, allowing a user to start and stop the engine by pushing an appropriate button, set an engine speed, monitor real-time engine data, alarms and trips, and program certain engine parameters. The control panel 22 can include a key switch 94 to turn on or off the control unit 20. The control panel 22 can also include switches 96 to turn on, turn off, and automatically control the prelube pump, starter motor, ignition, and the fuel gas. The control panel 22 can allow completely automatic starting and stopping of the engine and can include large status lights 98 displayed on the control panel 22. The data display 24 is preferably a four-line LCD display which shows the real-time engine data as well as status. The user can scroll through menus to see the data. The data display 24 can be used to program control parameters such as speed setpoint, prelube time, and other user programmable constants mentioned above.

User connections to the control system 10 are preferably implemented through an eight position terminal strip on the back of the control panel 22. The connections and functions of the terminal strip can be utilized as follows:

| Terminal | Description | Function |
| --- | --- | --- |
| 1 | +24 Volts, Analog | 4–20 ma |
| 2 | 4–20 ma Signal | RPM |
| 3 | Ground, Analog | Setpoint |
| 4 | External Start Signal | Remote Start |
| 5 | Alarm/Trip Status, OFF = TRIP/ALARM | Engine Status |
| 6 | Digital Ground | |
| 7 | +24 Volts, Digital | External Shutdown |
| 8 | External Shutdown | ON = RUN |

A pneumatic speed input device can be provided for the user to input a speed setpoint which is preferably set so that 0–6.5 psi=650 RPM and 12 psi=1200 RPM. The user can also use the data display 24 or a Flexnet data link to set a speed setpoint.

According to a further embodiment of the invention, a digital input module can be provided which includes a junction box with a 30-foot cable connected to the control unit 20. The user can use the digital input module to connect up to 40 additional alarm/shutdown switches for the control system 10 to activate. According to an exemplary embodiment, the user can program any of the 40 contact points as class A, B or C shutdowns via the data display 24/control panel 22. The user can also program a class B timeout via the data display 24/control panel 22. The status of these 40 contact shutdowns can be displayed on the LCD data display 24. The shutdowns can be acknowledged from the control panel 22.

The control system 10 can operate as a 24-volt system. An exemplary stand-alone power supply system can include an enclosed, brushless 30-amp, gear driven alternator, a power supply module and cables. The power supply module can contain two, sealed 12-volt, 30 amp-hour batteries, fuses, solid state relays for power switching and a battery charge regulator. The batteries can be designed to last between five and ten years. A connector port on the power supply module can be provided for charging the batteries with an external battery charger, or supplying power to a 24-volt device such as a light, or radio. The connector port can also be configured for the control system 10 to turn off and on a 24-volt device such as a siren.

The control system according to the present invention can improve starting performance, fuel consumption, load carrying capability, speed governing performance, and exhaust emissions control for a natural gas engine. It therefore represents a significant advance in engine control for an industrial fuel injected natural gas engine.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A control system for an internal combustion engine comprising:

means for detecting an air flow rate;

a fuel quality sensor for detecting a fuel quality;

a device for determining a fuel flow rate set point;

means for computing a maximum fuel flow rate based on the detected air flow rate and the detected fuel quality; and means for controlling a fuel flow based on the maximum fuel flow rate and the fuel flow rate set point.

2. The control system of claim 1, wherein the maximum fuel flow rate is computed based also on a predetermined air/fuel ratio.

3. The control system of claim 1, further comprising:

an exhaust turbine which drives an inlet air compressor; and an exhaust bypass valve which allows exhaust gas to bypass the exhaust turbine, wherein the computing means is adapted to control the exhaust bypass valve to supply a desired air flow rate to the engine.

4. The control system of claim 1, further comprising a main fuel rate control valve for controlling a main fuel rate and a pilot fuel rate control valve for controlling a pilot fuel rate, each of the valves being independently controllable by the control system.

5. The control system of claim 4, further comprising means for determining a stoichiometric air/fuel ratio, wherein the pilot fuel flow rate is controlled based on the stoichiometric air/fuel ratio, and the main fuel flow rate is controlled so as not to exceed the maximum fuel flow rate.

6. The control system of claim 1, further comprising:

means for detecting an actual engine speed;

means for setting a desired engine speed; and wherein the means for computing the maximum fuel flow rate computes the maximum fuel flow rate based also on the actual engine speed and the desired engine speed.

7. The control system of claim 1, wherein the fuel quality sensor comprises a molecular weight sensor which computes a molecular weight of fuel based on a propagation speed of a wave through the fuel.

8. A control system for an internal combustion engine comprising:

a fuel molecular weight sensor for detecting a molecular weight of a fuel;

means for computing a maximum fuel flow rate based on the detected fuel molecular weight; and means for limiting a flow rate of fuel supplied to the internal combustion engine based on the maximum fuel flow rate.

9. The control system of claim 8, further comprising:

means for detecting an air flow rate; and wherein the means for computing a maximum fuel flow rate computes the maximum fuel flow rate based also on the detected air flow rate and a predetermined air/fuel ratio.

10. The control system of claim 8, wherein the molecular weight sensor comprises:

a transducer for transmitting a wave through a sample of the fuel and for receiving the wave after the wave has travelled a predetermined distance through the fuel;

means for measuring a speed of the wave based on a time of transmission and reception of the wave; and means for computing the molecular weight of the fuel based on the measured speed of the wave.

11. The control system of claim 10, wherein the molecular weight sensor further comprises a temperature sensor for measuring a temperature of the fuel, and wherein the means for computing the molecular weight of the fuel computes the molecular weight of the fuel based on the following equation:

$$\text{molecular weight} = k \ast R \ast T_{fuel}/S^2$$

where k is the specific heat ratio of the fuel, R is the universal gas constant, $T_{fuel}$ is the temperature of the fuel, and S is the speed of the wave.

12. The control system of claim 10, wherein the transducer is an ultrasonic transducer.

13. The control system of claim 8, wherein the means for computing a maximum fuel flow rate computes the maximum fuel flow rate based on the detected fuel molecular weight such that engine knock does not occur.

14. The control system of claim 8, further comprising means for detecting an actual air flow rate.

15. The control system of claim 14, wherein the maximum fuel flow rate is computed based also on an input air fuel ratio and the actual air flow rate.

16. A control system of claim 15, further comprising means for determining a fuel flow set point based on an input engine speed.

17. The control system of claim 16, wherein the limiting means limits the flow rate of fuel supplied to the internal combustion engine based on the maximum fuel flow rate and the fuel flow set point.

18. The control system of claim 16, wherein the limiting means limits the flow rate of fuel supplied to the internal combustion engine based on the lower of the maximum fuel flow rate and the fuel flow set point.

19. The control system of claim 8, further comprising means for determining a maximum torque output for the engine based on the molecular weight of the fuel such that engine knock does not occur, the maximum fuel flow rate being computed based on the maximum torque output.

20. The control system of claim 8, further comprising means for determining an actual air fuel ratio, means for determining a target air flow based on an input air fuel ratio and the actual air fuel ratio, and means for directing an amount of exhaust gas to an exhaust turbine which drives an inlet air compressor such that an actual air flow rate substantially equals the target air flow rate.

21. A control system for an internal combustion engine comprising:

means for detecting an air flow rate;

a control unit for computing a maximum fuel flow rate based on the detected air flow rate and a predetermined air/fuel ratio;

an exhaust turbine which drives an inlet air compressor;

an exhaust bypass valve which allows exhaust gas to bypass the exhaust turbine, wherein the control unit controls the exhaust bypass valve to supply a desired air flow rate to the engine;

means for detecting an actual engine speed;

means for setting a desired engine speed; and wherein the control unit computes the maximum fuel flow rate based also on the actual engine speed and the desired engine speed.

22. The control system of claim 21, wherein the control unit calculates the desired air flow rate based on a detected air/fuel ratio and the predetermined air/fuel ratio such that the detected air/fuel ratio substantially equals the predetermined air/fuel ratio.

23. A control system for an internal combustion engine comprising:

means for detecting an air flow rate;

a control unit for computing a maximum fuel flow rate based on the detected air flow rate and a predetermined air/fuel ratio;

an exhaust turbine which drives an inlet air compressor;

an exhaust bypass valve which allows exhaust gas to bypass the exhaust turbine, wherein the control unit controls the exhaust bypass valve to supply a desired air flow rate to the engine;

a fuel quality sensor for sensing a fuel quality, and wherein the control unit computes the maximum fuel flow rate based also on the sensed fuel quality.

24. The control system of claim 24, wherein the fuel quality sensor comprises a molecular weight sensor.

25. The control system of claim 24, wherein the molecular weight sensor comprises:

a transducer for transmitting a wave through a sample of the fuel and for receiving the wave after the wave has travelled a predetermined distance through the fuel;

means for measuring a speed of the wave; and means for computing the molecular weight of the fuel based on the measured speed of the wave.

26. The control system of claim 25, wherein the molecular weight sensor further comprises a temperature sensor for measuring a temperature of the fuel, and wherein the means for computing the molecular weight of the fuel computes the molecular weight of the fuel based on the following equation:

molecular weight=$k*R*T_{fuel}/S^2$ where k is the specific heat ratio of the fuel, R is the universal gas constant, $T_{fuel}$ is the temperature of the fuel, and S is the speed of the wave.

* * * * *